United States Patent [19]

Hodgson et al.

[11] Patent Number: 5,029,823
[45] Date of Patent: Jul. 9, 1991

[54] VIBRATION ISOLATOR WITH ELECTRORHEOLOGICAL FLUID CONTROLLED DYNAMIC STIFFNESS

[75] Inventors: Douglas A. Hodgson; Theodore G. Duclos, both of Cary, N.C.

[73] Assignee: Lord Corporation, Erie, Pa.

[21] Appl. No.: 428,874

[22] Filed: Oct. 30, 1989

[51] Int. Cl.$^5$ .............................................. F16F 13/00
[52] U.S. Cl. .................................. 267/140.1; 267/219
[58] Field of Search ................. 267/140.1 A, 140.1 C, 267/140.1 AE, 140.1 E, 141, 219, 35; 188/267; 248/636, 562

[56] References Cited

U.S. PATENT DOCUMENTS

| | | | |
|---|---|---|---|
| 4,418,897 | 12/1983 | Härtel et al. | 267/140.1 |
| 4,469,316 | 9/1984 | van den Boom et al. | 267/140.1 |
| 4,572,490 | 2/1986 | Alciati | 267/140.1 |
| 4,720,087 | 1/1988 | Duclos et al. | 267/140.1 |
| 4,733,758 | 3/1988 | Duclos et al. | 188/267 |
| 4,742,999 | 5/1988 | Flower | 267/104.1 |
| 4,753,422 | 6/1988 | Thorn | 267/140.1 |
| 4,759,534 | 7/1988 | Hartel | 267/140.1 AE |
| 4,861,006 | 8/1989 | Takand et al. | 188/267 X |

FOREIGN PATENT DOCUMENTS

| | | |
|---|---|---|
| 3336965 | 5/1985 | Fed. Rep. of Germany . |
| 0120938 | 5/1988 | Japan ........................ 267/140.1 AE |
| 1282568 | 7/1972 | United Kingdom . |

OTHER PUBLICATIONS

M. Bernuchon, A New Generation of Engine Mounts, SAE Technical Paper Series No. 840,259, Feb. 27-Mar. 2, 1984.

W. Flower, Understanding Hydraulic Mounts for Improved Vehicle Noise, Vibration and Ride Qualities, SAE Technical Paper Series No. 850,975, May 15-17, 1985.

*Primary Examiner*—Matthew C. Graham
*Attorney, Agent, or Firm*—David L. McCombs; W. Graham Buie

[57] ABSTRACT

A vibration isolator including an electrorheological fluid filled partition assembly for providing variable dynamic stiffness characteristics. The partition assembly separates the variable volume fluid chambers of the isolator and includes movable electrode elements which define therebetween a chamber containing an electrorheological fluid. A fixed electrode is positioned between the movable electrode elements and separates the chamber into upper and lower portions. A plurality of openings extend through the fixed electrode allowing for passage of the electrorheological fluid between the portions in response to movement of the movable electrode elements. The yield stress developed in the electrorheological fluid by application of an electric field constrains movement of the movable electrode elements in response to input excitations thereby providing the isolator with a selectable dynamic stiffness.

18 Claims, 2 Drawing Sheets

VIBRATION ISOLATOR WITH ELECTRORHEOLOGICAL FLUID CONTROLLED DYNAMIC STIFFNESS

FIELD OF THE INVENTION

The present invention relates in general to fluid filled vibration isolators which experience certain dynamic operating characteristics according to the amplitude and frequency of input excitations. More specifically, the present invention provides an isolator of the above type which includes an electrorheological fluid filled partition assembly for providing variable dynamic stiffness characteristics.

BACKGROUND OF THE INVENTION

The basic function of a vibration isolator is to isolate, for example, a vehicle structure from input excitations or vibrations generated by an engine or drive train while at the same time adequately supporting these elements for their proper operation within the vehicle. A typical vibration isolator or mount may include a pair of superimposed variable volume, fluid filled chambers separated by a partition. Fluid communication between the chambers during operation of the isolator may occur through an orifice in the partition and/or an elongate inertia track passageway extending between the chambers. Inertia forces generated in the fluid moving between chambers can be utilized to enhance the desired attenuation of vibratory forces. The inertia forces of the oscillating fluid can reduce the dynamic stiffness of the mount at some particular frequency of input excitation, to provide a low stiffness "notch" at a particular excitation frequency where a vibration problem exists. See U.S. patent application Ser. No. 392,089, filed Aug. 8, 1989, and entitled "Mount with Adjustable Length Inertia Track" owned by the assignee of the present invention.

Additional improvement in the operating characteristics of a vibration isolator may be achieved by reducing the overall dynamic stiffness of a vibration isolator for high frequency, low amplitude input excitations while at other times retaining a sufficiently large loss angle or mount "stiffness". As an example, the isolation of low amplitude engine idle oscillations is improved by using a mount of "soft" dynamic stiffness. At the same time, the mount must allow for proper control of the position of the engine and limit the amplitude of movements under static or quasi-static loads such as during acceleration, braking, cornering and torque overloads, etc. Such large engine loads cannot be adequately accommodated by the mount with a low dynamic stiffness to provide a safe, stabilized mounting system.

Two modes of operation in a vibration isolator are provided by a so called fluid decoupler. A decoupler allows for relatively low dynamic stiffness characteristics for high frequency, low amplitude input excitations and other dynamic stiffness characteristics for relatively lower frequency, larger amplitude input excitations. Most decouplers are incorporated in the partition between the opposing fluid chambers of a vibration isolator and oscillate in response to alternate pressurization of the fluid chambers caused by the input excitations. For low input amplitudes, the decoupler will oscillate relatively freely in what is termed the "decoupled state". In this mode, the required low level or soft dynamic stiffness is maintained. For large input amplitudes across the isolator, the fluid pressure will force the decoupler to engage its seat and under these conditions the isolator will be operating in the high dynamic stiffness mode. Exemplary decoupler arrangements are described in U.S. Pat. No. 4,401,897; U.S. Pat. No. 4,469,316; and U.S. Pat. No. 4,742,999.

While known decouplers can be constructed to switch with predictability between the low dynamic stiffness (decoupled) and the high dynamic stiffness (coupled) modes, the particular frequency and amplitude at which this transition occurs may not be readily varied or controlled during operation of the vibration isolator. Moreover, mounts of this type offer limited or no control over the dynamic operating characteristics of the system when in the low dynamic stiffness mode. Another problem associated with existing decouplers is that the transition between the decoupled and coupled modes may be somewhat abrupt which can cause adverse effects resulting from engagement of the decoupling element with the seat.

An effort to achieve improved control capabilities in vibration isolators has been accomplished with the use of electrorheological fluids. Electrorheological fluids exhibit an increase in apparent viscosity when subjected to a high voltage electric field. Mounts which utilize electrorheological fluids to adjust their dynamic stiffness characteristics include those disclosed in U.S. Pat. No. 4,733,758 and U.S. Pat. No. 4,720,087. The mount in U.S. Pat. No. 4,720,087 also includes multiple fixed electrode plates in contact with an electrorheological fluid and enclosed by upper and lower diaphragms. The diaphragms provide "decoupling action" in that they produce minimal damping of small amplitude excitations and large damping of greater amplitude excitations when the diaphragms engage the electrode plates. Because the electrode plates are oriented parallel to the direction of electrorheological fluid movement, it is the yield stress of the electrorheological fluid in shear that dominates the adjustment of the dynamic stiffness. While this arrangement may function satisfactorily for certain applications, it has been found that improved control and greater load carrying capability can be accomplished where the tensile and comprehensive yield stress properties of the electrorheological fluid also determine the dynamic stiffness characteristics of the vibration isolator. Electrorheological fluid yield stress in tension and/or compression is generally three times as great as that in shear and can be utilized to increase the overall stress state achievable per unit volume of fluid in a particular isolator application. Additional control over the movement of elements which provide decoupling action may also be realized when dictated in part by the tensile and compressive yield stress of an electrorheological fluid in surface contact with the decoupling element.

In view of the foregoing, there is a need for a vibration isolator having a electrorheological fluid filled partition assembly which takes advantage of the tensile and compressive properties of the electrorheological fluid in addition to simple shear properties for adjustment of dynamic stiffness characteristics.

SUMMARY OF THE INVENTION

It is therefore an object of the present invention to provide a vibration isolator which has improved dynamic stiffness characteristics over existing fluid mounts.

It is a further object of the present invention to provide an isolator of the above type in which the isolator operating characteristics may be dynamically tuned.

It is a more specific object of the present invention to provide a vibration isolator with a disc type partition assembly that experiences variable dynamic stiffness characteristics according to the magnitude of an electric field applied to an electrorheological fluid contained between movable electrode elements of the assembly.

It is a further object of the present invention to provide an isolator of the above type in which the dynamic stiffness characteristics are determined at least in part by the tensile and compressive yield stress properties of the electrorheological fluid between the movable electrode elements.

It is a still further object of the present invention to provide an isolator of the above type in which the partition assembly provides for decoupling action between relatively low and high dynamic stiffness modes of operation at variable and selectable frequencies and amplitudes of input excitations.

Towards the fulfillment of these and other objects, a hydraulic vibration isolator is provided which may be dynamically tuned continuously between a range of frequencies and displacements of input excitations to provide desirable dynamic stiffness characteristics. The isolator is tuned in the foregoing regard by the provision of a partition assembly containing an electrorheological fluid located between variable volume fluid chambers of the isolator.

The partition assembly provides spaced, movable electrode elements which define therebetween a chamber containing an electrorheological fluid. A fixed electrode is positioned between the movable electrodes and separates the electrorheological fluid chamber into upper and lower portions thereof. A plurality of openings extend through the fixed electrode allowing for passage of the electrorheological fluid between the portions in response to movement of the movable electrode elements. A yield stress is developed in the electrorheological fluid having a yield strength which increases with the voltage potential applied between the electrodes. The compressive and/or tensile yield strength of the electrorheological fluid constrains movement of the movable electrode elements in response to input excitations thereby providing for an isolator with selectable dynamic stiffness characteristics.

The isolator allows for relatively low, yet variable dynamic stiffness characteristics for high frequency, low amplitude input excitations and relatively high dynamic stiffness characteristics for relatively lower frequency, larger amplitude input excitations. The partition assembly may be provided also with limit stops to prevent contact between the fixed electrode and movable electrode elements. At times when a movable electrode engages the limit stops or is otherwise sufficiently constrained in its movement by the yield strength developed in the electrorheological fluid, the isolator experiences relatively high dynamic stiffness characteristics.

DESCRIPTION OF THE DRAWINGS

For a better understanding of the invention, reference may be made to the following description of exemplary embodiments, taken in conjunction with the figures of the accompanying drawings, in which.

DESCRIPTION OF THE PREFERRED EMBODIMENTS

Figure 1:
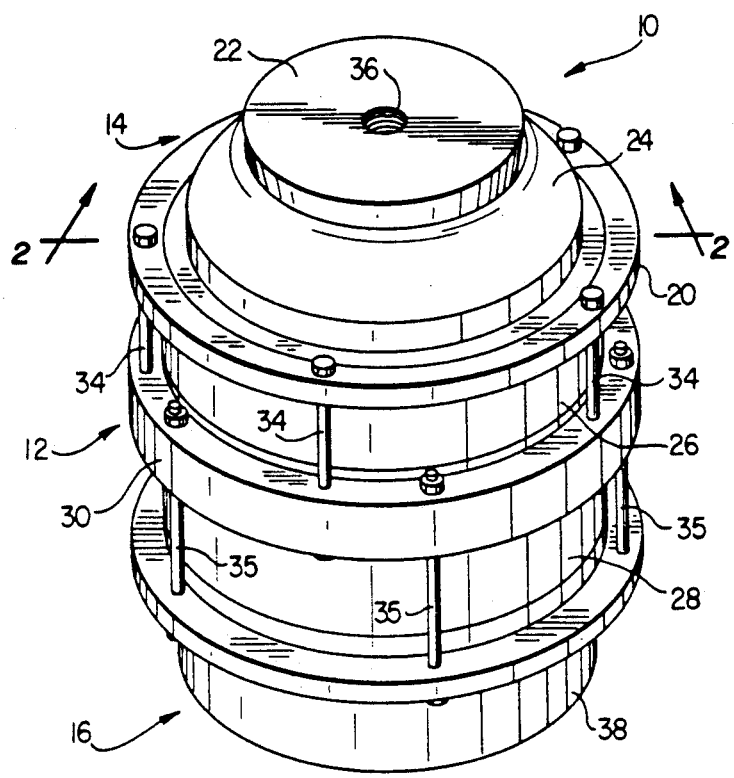
FIG. 1 is a perspective view of a fluid isolator of the present invention.
Figure 2:
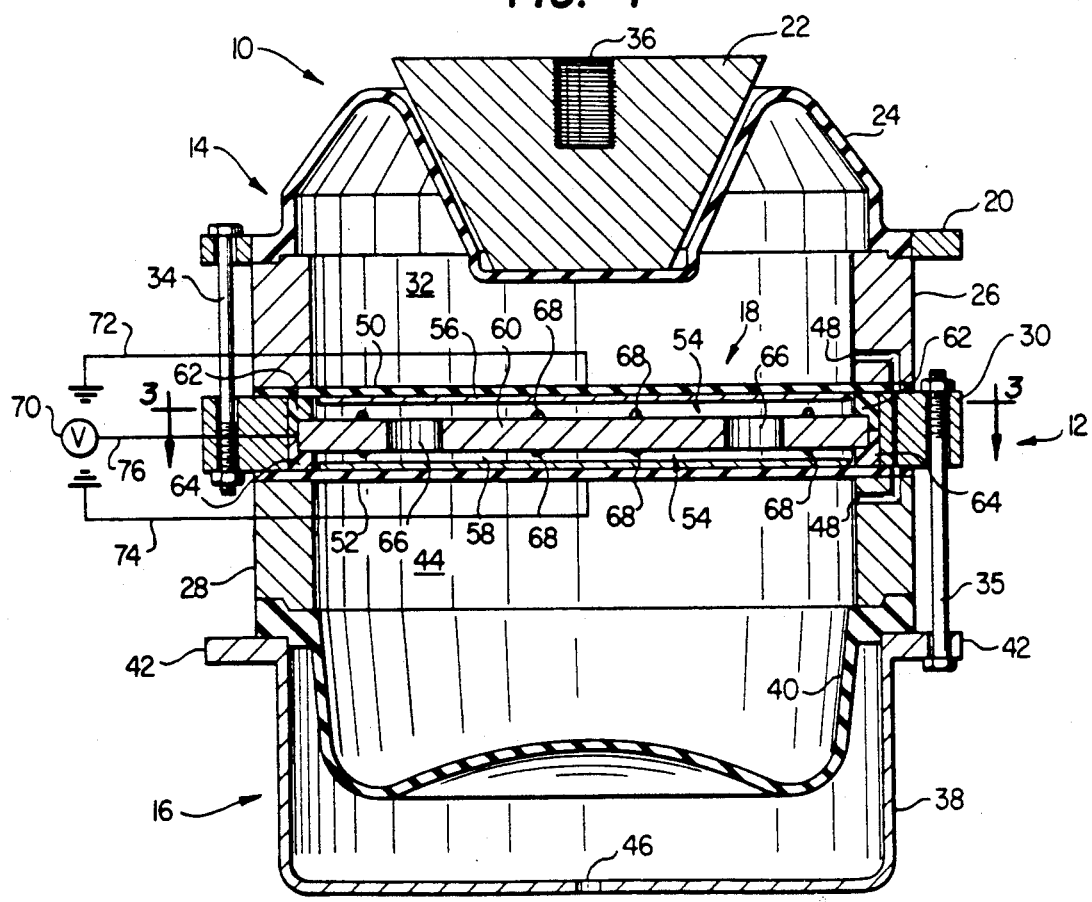
FIG. 2 is an enlarged, vertical cross-sectional view of the isolator of the present invention taken along lines 2—2 of FIG. 1.

Referring to FIGS. 1 and 2 of the drawings, there is designated by reference numeral 10 a fluid vibration isolator or similar device for attenuating the transmission of vibrations and/or shock forces between relatively movable vibration transmitting and receiving members (not shown), such as the engine and frame components of an automobile or other vehicle. The isolator 10 includes a rigid housing 12, an upper assembly 14 and a lower assembly 16. A partition assembly 18 (FIG. 2) is included within the housing 12.

The upper assembly 14 includes a rigid base 20 and a rigid support 22. The base 20 and the support 22 are interconnected for vertical movement relative to each other by a resilient spring-like elastomeric element 24 of generally frusto-conical shape. The upper assembly 14 is secured to the housing 12 in a manner to be described. A sealing member (not shown) may also be positioned between the base 20 and the housing 12 to prevent leakage of hydraulic fluid (subsequently discussed) therefrom at their mating surfaces.

The housing 12 includes an upper collar 26, a lower collar 28 and a center ring 30. The upper collar 26 and the upper assembly 14 define an upper, variable volume fluid chamber 32, the capacity of which is decreased and increased by relative movement of the base 20 and the support 22 toward and away from each other. The center ring 30 is of a larger diameter than the upper and lower collars 26, 28 and serves as a support for the collars. The upper assembly 14, the upper collar 26 and the center ring 30 are intersecured by suitable fasteners such as bolts 34. The bolts extend through bores in the base 20 and bores in the center ring 30 and hold the upper collar 26 in tension between the assembly 14 and the center ring. The center ring 30 also supports the partition assembly 18, subsequently discussed.

The housing assembly 12 is adapted to be connected by means (not shown) to one of the two members interconnected by the isolator 10 (also not shown). The support 22 of the upper assembly 14 is similarly adapted to be connected, as for example by its illustrated threaded bore 36, to the other of such members.

The lower assembly 16 includes a rigid end cap 38 and a resilient, flexible diaphragm 40 made of elastomer or similar material. The periphery of the diaphragm 40 is clamped in a fluid tight manner between a peripheral flange 42 of the end cap 38 and the lower collar 28. The lower assembly 16 is connected to the housing 12 in a manner similar to that of the upper assembly 14. A plurality of fasteners, such as bolts 35, extend through bores in the flange 42 and bores in the center ring 30 to hold the lower collar 28 in tension between the lower assembly 16 and the center ring. The space between the diaphragm 40 and the partition assembly 18 defines a second or lower variable volume fluid chamber 44. The end cap 38 has an opening 46 within its lower wall to facilitate movement of the diaphragm 40 within the cap.

Although not shown in the drawings, the upper and lower chambers 32, 44 are substantially filled with a hydraulic fluid such as water, and/or glycol, alcohol or the like. A passage 48 extends between the upper and lower chambers 32, 44 through bores in the walls of the upper and lower collars 26, 28 and through the center ring 30. It is understood that the bores for the passage 48 may be machined, drilled or otherwise formed in the upper and lower collars 26, 28 and the center ring 30 and must be properly aligned upon assembly of these components to permit fluid flow therethrough. As illustrated with respect to the present embodiment of the invention, the passage 48 provides for equalization of fluid pressures between the upper and lower variable volume chambers 32, 44 under static or near static load conditions. Because the cross-sectional area of the passage 48 is relatively small, resistance to fluid flow through the passage will prevent significant flow in response to input excitations to the isolator 10.

Referring to FIG. 2 of the drawings, the partition assembly 18 includes flexible members 50 and 52 which are spaced one from the other and define therebetween a fluid-tight chamber 54. Each of the flexible members 50, 52 is generally circular and formed of a resilient material such as elastomer or the like. The periphery of each member 50, 52 is secured, respectively, between the upper and lower collars 26, 28 and the center ring 30 in a manner to provide a fluid tight seal between the chamber 54 and each of the upper and lower chambers 32, 44. If necessary, small openings may be provided in each of the members 50, 52 to prevent obstruction of the passage 48. Electrodes 56 and 58 are attached to the respective surfaces of members 50, 52 within the chamber 54. The electrodes 56, 58 are rigid, conductive elements formed of metal or the like and may be adhered to the flexible members 50, 52 in a suitable manner. The diameter of each of the electrodes 56, 58 is sufficiently less than that of the flexible members 50, 52 to permit movement of the flexible members in response to fluid pressure differentials between the upper and lower chambers 32, 44 caused by input excitations to the isolator. Alternatively, the electrode 56 and the flexible member 50 (or the electrode 58 and the flexible member 52) may be comprised of a single conductive flexible material. In this one piece configuration, the central portion of the flexible material must be more rigid than the outer portion of the material, and this may be accomplished by ensuring a higher density of material in the central portion.

Figure 3:
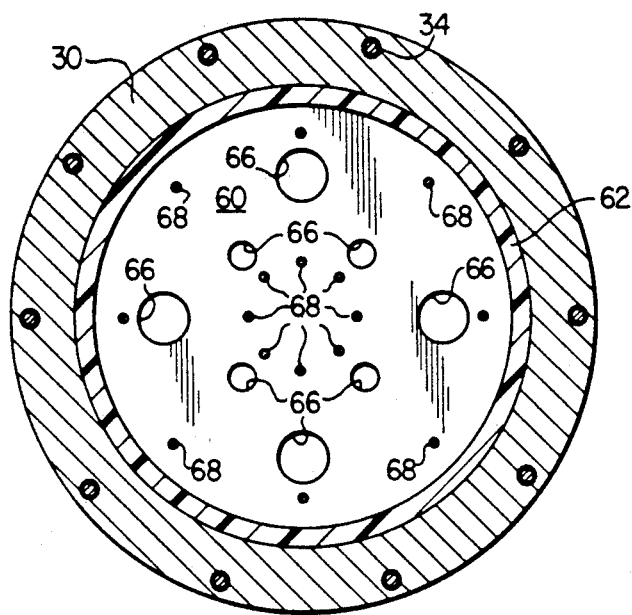
FIG. 3 is an enlarged, horizontal cross sectional view of the isolator of the present invention taken along lines 3—3 or FIG. 2.

Referring now to both FIGS. 2 and 3, a rigid, conductive element, or electrode, 60 of the assembly 18 divides the fluid tight chamber 54 into upper and lower portions. Spacer rings 62, 64 circumscribing the periphery and outer radial edge of the electrode 60 support the electrode in its fixed position between the upper and lower collars 26, 28 coaxial with the center ring 30. The spacer rings 62, 64 are constructed of electrically nonconductive material and electrically insulate the electrode 60 from the housing 12. A plurality of openings 66 extend through the electrode 60 to permit the flow of an electrorheological fluid (subsequently discussed) between the upper and lower portions of the chamber 54 in a manner to be described. The number, size and placement of the openings 66 may be selected according to the desired operating conditions of the isolator 10. As shown in FIG. 3, the openings 66 are spaced in an even pattern about the electrode 60 with the openings 66 closer to the center of the electrode being of a reduced diameter. A plurality of limit stops 68 are attached in a spaced relationship to both the upper and lower surfaces of the electrode 60 to prevent direct contact between the surfaces of the electrode 60 and the movable electrodes 56, 58. The limit stops 68 are constructed of suitable electrically nonconductive material to prevent electrical arcing between the electrodes. Because the limit stops arrest movement of the electrodes 56, 58 toward the electrode 60 they can significantly alter the dynamic stiffness characteristics of the isolator 10 when either of electrodes 56, 58 engage the limit stops, as will be described.

As shown schematically in FIG. 2, a power source 70 is connected to each of the electrodes 56, 58 and 60. Two wires 72 and 74 respectively extend from the electrodes 56, 58 through the flexible members 50,52 and the housing 12 to the power source 70. Similarly, a wire 76 extends from the electrode 60 through the housing 12 to the power source 70. As shown in the drawing, the electrodes 56, 58 are grounded and a voltage may be applied to the electrode 60. In this manner, an electric field can be produced as desired across each of the portions of the chamber 54.

It is understood that the chamber 54 is substantially filled with an electrorheological fluid (not shown). As known to those skilled in the art, electrorheological fluids customarily are comprised of solid hydrophylic particles suspended within a hydrophobic liquid. In the absence of an electric field, electrorheological fluids exhibit Newtonian flow characteristics such that their shear rate is directly proportional to shear stress. However, when an electric field is applied, a yield stress phenomenon occurs such that no shearing takes place until the shear stress exceeds a yield value which rises with increasing electric field strength. Similarly, tensile and compressive yield stress values of the electrorheological fluid increase with increasing electric field strength. The result can appear as an increase in apparent viscosity of several orders of magnitude. The electrorheological fluid within the chamber 54 is activated to alter its yield stress characteristics at desired times by the provision of the electric field across the portions of the chamber 54.

During operation, movement of the base 20 and support 22 toward and away from each other causes alternating increases and decreases in the fluid pressure differential of the hydraulic fluid between the upper and lower chambers 32, 44. More specifically, movement of the support 22 relative to the base 20 causes changes in the volume of the chamber 32 and thus the pressure experienced by the fluid relative to that in the lower chamber 44. For very low frequency excitations or in response to placement of a static load on the isolator 10, equalization of the fluid pressure differential between the upper and lower chambers 32, 44 is accomplished by the flow of the hydraulic fluid through the passage 48. However, input excitations to the isolator 10 normally associated with a motion condition experienced between the vibration transmitting and receiving members creates fluid pressure differentials between the upper and lower chambers 32, 44 which are not significantly relieved by the flow of fluid through the passage 48.

The partition assembly 18 which divides the chambers 32, 44 operates to control the overall dynamic stiffness characteristics of the isolator 10. For many applications, it may be desirable for the isolator 10 to minimize vibrations of small displacement or amplitude, such as those created at high frequencies by a internal combustion engine. It is also important for the isolator 10 to be able to accommodate lower frequency vibrations of large amplitude typically produced by vehicle motion. Operation of the isolator 10 in both a relatively low dynamic stiffness mode and relatively high dynamic stiffness mode may be accomplished by dynamically tuning the dynamic stiffness characteristics of the partition assembly 18.

Figure 4:
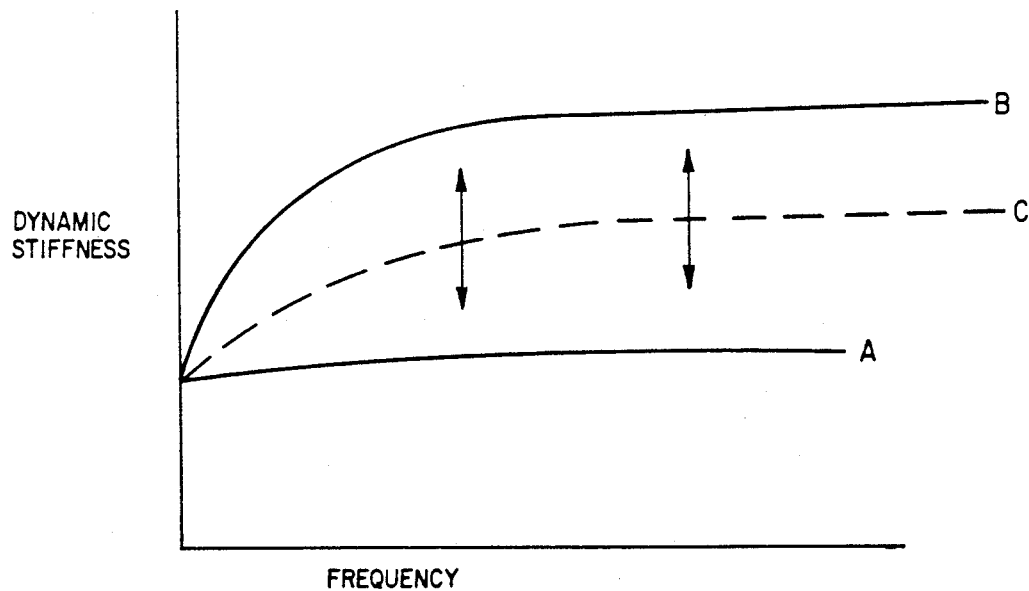
FIG. 4 is a graphical representation of the relationship between dynamic stiffness and frequency for the isolator of the present invention operating between relatively low and relatively high dynamic stiffness states wherein the dynamic stiffness of the isolator is shown as being adjustable in response to changes in yield stress of the electrorheological fluid.

Referring now to FIG. 4 of the drawings, there is illustrated the relationship between dynamic stiffness of the isolator 10 and frequency of input excitation. Curve A shows the isolator 10 operating in a low dynamic stiffness mode. Generally, the isolator experiences low dynamic stiffness when operating in the "off" state such that no electric field is applied across the upper and lower portions of the chamber 54. The flexible members 50, 52 and their corresponding electrodes 56, 58 are relatively free to move with respect to the electrode 60 in response to input excitations to the isolator 10. Movement of the support 22 relative to the base 20 causes changes in the fluid pressure differential between the upper and lower chambers 32, 44 as previously discussed which in turn causes movement of the flexible members 50, 52. The members 50, 52 and the electrodes 56, 58 are relatively free to move since in the absence of an electric field, the electrorheological fluid within the chamber 54 is characterized by a relatively low yield stress and therefore displaces and flows easily between the portions of the chamber 54 through the openings 66. Low dynamic stiffness characteristics are usually preferred in response to high frequency, low amplitude input excitations to the isolator 10 for better isolation.

Curve B of FIG. 4 shows the isolator 10 operating in a high dynamic stiffness mode. If the displacement or amplitude of the input excitations to the isolator 10 which cause movement of the members 50, 52 and the electrodes 56, 58 as previously described is sufficiently large, the electrodes may be caused to engage the limit stops 68. When either of the electrodes 56, 58 engage the limit stops 68, the flexible members 50, 52 are temporarily arrested and the dynamic stiffness of the isolator will be relatively high as illustrated by curve B. When operating in the high dynamic stiffness mode, the bulge stiffness or compliance of the upper assembly 14 and the lower assembly 16 primarily govern the overall mount operating characteristics. The high dynamic stiffness mode may also be effected by causing the isolator 10 to operate in the "on" state such that an electric field is applied across the portions of the chamber 54 by the power source 70. In the presence of the electric field, the electrorheological fluid will experience an increase in yield stress and will in effect, "solidify," and will not easily displace or pass between the upper and lower portions of the chamber 54 through the openings 66. The tensile or compressive yield stress developed in the electrorheological fluid serves to arrest the movable members 50, 52 so that the isolator 10 experiences the high dynamic stiffness characteristics of curve B.

It may also be desireable to further vary or control the operating characteristics of the isolator 10. According to the present invention, the dynamic stiffness of the isolator 10 may be continuously varied according to the strength of yield stress developed in the electrorheological fluid within the chamber 54, as illustrated by curve C in FIG. 4. As previously mentioned, movement of the members 50, 52 relative to the fixed electrode 60 is constrained by the tensile/compressive yield stress developed in the electrorheological fluid between the electrodes 56, 58 and the fixed electrode. The yield stress experienced by the electrorheological fluid and, hence, the dynamic stiffness characteristics of the isolator 10 may be adjusted over a continuous range (represented by the arrows showing movement of the curve C) by adjusting the voltage potential applied by the power source 70 between the electrodes.

It is understood that the yield stress properties of the electrorheological fluid in shear contribute to the resistance of movement of the electrorheological fluid between the portions of the chamber 54 through the openings 66. It is nonetheless apparent that the yield stress characteristics of the electrorheological fluid in tension and compression in the area between the electrodes are significant in constraining or arresting movement of the members 50, 52 and in this regard provide for improved control over the dynamic stiffness characteristics of the isolator 10.

Figure 5:
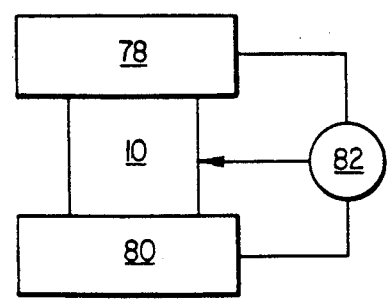
FIG. 5 is a schematic representation of the isolator of FIG. 1 in association with supported and supporting members and control components.

FIG. 5 is a diagrammatic illustration of the isolator 10 of the present invention as connected to engine and/or frame components 78, 80 of a vehicle or the like. The voltage potential between the electrode 60 and the electrodes 56, 58 provided by the power source 70 is controlled by a computer 82 or similar controller, which receives input signals from sensors (not shown) associated with the engine 78 and/or the frame 80, as well as from other sources such as an internal program or other means. The system enables the isolator 10 to be dynamically tuned during operation of the vehicle so as to achieve conditions of preferred dynamic stiffness at any of the differing frequencies and/or amplitudes of excitation of the isolator. Although not specifically illustrated in the drawings, it is understood that other additional and necessary equipment and structural components will be provided and that these and all of the components described above are arranged and supported in an operative fashion to form a complete and operative system.

It is also understood that variations may be made in the present invention without departing from the spirit and scope of the invention. For example, other fluid flow passage arrangements between the upper and lower chambers may be contemplated which contribute to the overall dynamic stiffness characteristics of the mount. Inertia augmented damping may be achieved with the provision of an inertia track passageway between the upper and lower chambers. Also, the construction of the electrodes attached to the flexible members may be modified. A conductive coating, foil or other conductive surfacing may be applied to the flexible members. Alternative wiring arrangements through the housing for electrically connecting the electrodes to the power source are also contemplated.

While it is understood that the isolator as described herein may be used in automotive applications as either an engine or transmission mount, further automotive applications might include body mounts, steering column mounts and exhaust system mounts. It is likely that the principles of the present invention can be used to solve ride and noise problems in nonautomotive applications. Further, because the components of the present invention are of relatively simple construction, they may be manufactured inexpensively by low cost, high speed mass production techniques and assembled readily.

It is also understood that variations may be made in the present invention without departing from the spirit and scope of the invention. Accordingly, it is appropriate that the appended claims be construed broadly and in a manner consistent with the scope of the invention.

What is claimed is:

1. Apparatus for connecting between two members for supporting said members and isolating them from input excitations, said apparatus comprising a housing formed in part of resilient material and defining a first fluid chamber containing a hydraulic fluid, means responsive to said input excitations for varying the volume of said first chamber to isolate said members from said input excitations, a first electrode disposed in said first chamber, a second electrode disposed in said first chamber and defining, with said first electrode, an enclosed second chamber, said second electrode being responsive to variations in the volume of said first chamber for moving relative to said first electrode for varying the volume of said second chamber, an electrorheological fluid enclosed in said second chamber and isolated from said hydraulic fluid of said first chamber, and means responsive to said input excitations for varying the yield stress of said electrorheological fluid to control said movement of said second electrode and therefore the variations of said volume of said first chamber to control the dynamic stiffness characteristics of said isolator.

2. The apparatus according to claim 1 wherein said means responsive to said input excitations comprises a first element connected to one of said members and a second element connected to the other of said members, wherein one of said elements is operatively connected to said resilient material.

3. The apparatus according to claim 1 wherein said means for varying said yield stress includes electric field generating means for providing a voltage potential between said electrodes.

4. The apparatus according to claim 3 wherein said electric field generating means comprises a power source and wiring extending between said power source and said electrodes.

5. The apparatus according to claim 3 further comprising computing means responsive to said input excitations for varying the voltage potential applied between said electrodes.

6. A vibration isolator for isolating members from input excitations comprising a housing formed in part of resilient material and defining variable volume fluid chambers, partition means positioned in said housing for controlling the dynamic stiffness characteristics of said isolator, said partition means including at lease one spaced movable electrode defining an enclosed central chamber containing an electrorheological fluid and isolating said electrorheological fluid from said variable fluid chambers, a fixed electrode separating said central chamber into upper and lower portions thereof, at least one opening in said fixed electrode for permitting flow of said electrorheological fluid between said portions in response to movement of said moveable electrodes, means providing an electric field between said electrodes to alter the yield stress of said electrorheological fluid in said portions and thereby control movement of said moveable electrodes, and fluid passage means interconnecting said fluid chambers.

7. The vibration isolator according to claim 6 further comprising limit stop means for preventing said moveable electrodes from contacting said fixed electrode.

8. The vibration isolator according to claim 7 wherein said limit stop means comprise at least one nonconductive protrusion attached to at least one of said moveable electrodes and said fixed electrode.

9. The vibration isolator according to claim 6 wherein said moveable electrode comprises a conductive plate connected to a flexible element.

10. The vibration isolator according to claim 6 wherein said fixed electrode is secured in said housing by an insulated retaining member.

11. The vibration isolator according to claim 6 wherein said means providing an electric field is controllable to adjustably vary the voltage potential between said electrodes 12. The vibration isolator according to claim 6 wherein said fluid passage means comprises one or more bores through said housing.

13. A vibration isolator having variable dynamic stiffness characteristics and being operative between both a relatively high dynamic stiffness mode and a relatively low dynamic stiffness mode comprising a housing formed in part of resilient material and defining variable volume fluid chambers, partition means between said chambers, said partition means including spaced movable electrodes defining an enclosed central chamber containing an electrorheological fluid and isolating said electrorheological fluid from said variable volume fluid chambers, a fixed electrode separating said central chamber into portions thereof, at least one opening in said fixed electrode for permitting flow of said electrorheological fluid between said portions in response to movement of said movable electrodes, stop means between said movable electrodes and said fixed electrode, means providing an electric field between said electrodes for altering the yield stress of said electrorheological fluid in said portions, and fluid passage means interconnecting said variable volume fluid chambers.

14. The vibration isolator according to claim 13 wherein said isolator operates in said low dynamic stiffness mode when said movable electrodes move relative to said fixed electrode.

15. The vibration isolator according to claim 13 wherein said isolator operates in said high dynamic stiffness mode when movement of one or both of said movable members are arrested.

16. The vibration isolator according to claim 13 wherein the dynamic stiffness characteristics of said isolator are variable by adjusting said electric field means to change the yield stress of said electrorheological fluid between said electrodes.

17. The vibration isolator according to claim 16 wherein said adjustments to said electric field means are controlled by computer.

18. A method for adjusting the dynamic stiffness characteristics of a vibration isolator of the type having two or more isolated variable volume fluid chambers, comprising the steps of partitioning at least one variable volume fluid chamber of said isolator from another, said partitioned chamber having at least two electrodes at least one of which is movable, enclosing an electrorheological fluid between said electrodes and isolating said electrorheological fluid within said partitioned chamber, controlling movement of said at least one movable electrode by applying an electric field to said electrorheological fluid to vary the yield stress of said electrorheological fluid, and adjusting the magnitude of said electric field to select the dynamic stiffness characteristics of said isolator.

* * * * *

UNITED STATES PATENT AND TRADEMARK OFFICE
CERTIFICATE OF CORRECTION

PATENT NO. : 5,029,823

DATED : July 9, 1991

INVENTOR(S) : Hodgson et al.

It is certified that error appears in the above-identified patent and that said Letters Patent is hereby corrected as shown below:

Col. 3, line 5, change "disc type" to --disc-type--.

Col. 4, line 6, change "cross sectional" to --cross-sectional--.

IN THE CLAIMS:

Col 9, line 63, change "fluid chambers" to --volume fluid chambers--.

Signed and Sealed this

Tenth Day of November, 1992

Attest:

DOUGLAS B. COMER

Attesting Officer

Acting Commissioner of Patents and Trademarks